US007852265B2

(12) United States Patent
Milano et al.

(10) Patent No.: US 7,852,265 B2
(45) Date of Patent: Dec. 14, 2010

(54) WIRELESS AREA NETWORK COMPLIANT SYSTEM AND METHOD USING A PHASE ARRAY ANTENNA

(76) Inventors: Alberto Milano, 9/6 Shimoni Street, Rehovot (IL) 76248; Hillel Weinstein, 22 Haknesset Hagdola Street, Tel-Aviv (IL) 62917

( * ) Notice: Subject to any disclaimer, the term of this patent is extended or adjusted under 35 U.S.C. 154(b) by 268 days.

(21) Appl. No.: 12/111,984

(22) Filed: Apr. 30, 2008

(65) Prior Publication Data

US 2008/0272962 A1 Nov. 6, 2008

(30) Foreign Application Priority Data

May 2, 2007 (IL) ..................................... 182936

(51) Int. Cl.
*H04B 7/00* (2006.01)

(52) U.S. Cl. ...................................... 342/367; 342/374

(58) Field of Classification Search ................. 342/367, 342/374

See application file for complete search history.

(56) References Cited

U.S. PATENT DOCUMENTS 5,086,430 A * 2/1992 Kapon et al. ........... 372/50.123
2004/0192232 A1 * 9/2004 Szopko et al. ............... 455/103
2008/0153501 A1 * 6/2008 Harris et al. ................ 455/446

OTHER PUBLICATIONS

IEEE transactions on Microwave Theory and techniques, vol. 54, No. 6, Jun. 2006, Camilla Karnfelt, p. 1.*

* cited by examiner

*Primary Examiner*—Thomas H Tarcza
*Assistant Examiner*—Harry Liu
(74) *Attorney, Agent, or Firm*—Soroker Agmon Advocates & Patent Attorneys

(57) ABSTRACT

A wireless area network communication system comprising at least one phased array antenna frame, a phased array antenna circuit connected to the at least one phased array antenna frame wherein said phased array circuit and said at least one phased array antenna frame are adapted to transmit and receive wireless area network compliant signals from or to wireless area network devices.

30 Claims, 9 Drawing Sheets

WIRELESS AREA NETWORK COMPLIANT SYSTEM AND METHOD USING A PHASE ARRAY ANTENNA

RELATED APPLICATIONS

Patent applications serial number PCT/IL2006/001144 filed on Oct. 3, 2006 and titled PHASE SHIFTED OSCILLATOR AND ANTENNA and PCT/IL2006/001039 filed on Sep. 6, 2006 and titled APPARATUS AND METHODS FOR RADAR IMAGING BASED ON INJECTED PUSH PUSH OSCILLATORS the disclosures of which is incorporated herein by reference.

FIELD OF THE INVENTION

The present invention relates generally to the field of broadband access and more particularly to a method and system using a phase array antennas in Wireless Communication Networks.

BACKGROUND OF THE INVENTION

As the amount of home and office wireless accessories is rapidly increasing, there is an increasing demand for broadband wireless access solutions.

As an example, a standard that has been defined to regulate this communication domain is the IEEE 802.15 which is divided to five sub groups 802.15.1-802.15.5. Among these standards, 802.15.3 which deals with High Rate WPAN (Wireless Personal Area Network) is very important for mainly indoor wireless communication.

The IEEE 802.15.3 Task Group 3c (TG3c) was formed in March 2005. TG3c is developing a millimeter-wave-based alternative physical layer (PHY) for the existing 802.15.3 Wireless Personal Area Network (WPAN) Standard 802.15.3-2003.

This mm-Wave WPAN will operate in the new and clear band including 57-64 GHz unlicensed band defined by FCC 47 CFR 15.255. The millimeter-wave WPAN will allow high coexistence (close physical spacing) with all other microwave systems in the 802.15 family of WPANs.

In addition, the millimeter-wave WPAN will allow very high data rate over 1 Gbit/s applications such as high speed internet access, streaming content download (video on demand, HDTV, home theater, etc.), real time streaming and wireless data bus for cable replacement. Optional data rates in excess of 3 Gbit/s will be provided.

The need to implement communication system in this frequency range, with such broadband capabilities and at the same time to comply with a commercial requirement of low-cost imposes severe technical difficulties.

One of the candidates to implement this communication domain is MIMO (multiple input multiple output). However for several reasons, (as simulations calculations and mechanical considerations), MIMO is considered not suitable for the foregoing requirements.

There is a need for an innovative technology in order to provide a cost effective system that will be able to fulfill the requirements of high frequency, high bandwidth and low cost. The technical system performance recognized as indispensable for the mentioned achievements is the improvement of the antenna beam focus, together with the ability of wide beam steering of the antenna.

A possible solution is the use of phased arrays antenna system, which had recently shown significant improvements.

SUMMARY OF THE INVENTION

An aspect of an embodiment of the invention relates to a method and system for implementing a WPAN by phased array antenna devices.

In accordance with a preferred embodiment of the present system, there is provided a wireless area network communication system comprising at least one phased array antenna frame, a phased array antenna circuit connected to the at least one phased array antenna frame wherein the phased array circuit and said at least one phased array antenna frame are adapted to transmit and receive wireless area network compliant signals from or to wireless area network devices.

In some exemplary embodiments of the system the phased array antenna frame transmits or receives radiation.

In some exemplary embodiments of the system the phased array antenna circuit serves for driving and controlling said at least one phased array antenna frame.

In some exemplary embodiments of the system the wireless area network is a wireless personal area network.

In some exemplary embodiments of the system the phased array antenna frame comprises at least two groups of radiators wherein one of the groups of radiators is defined as a reference group.

In some exemplary embodiments of the system one of the groups of radiators is controlled by said phased array circuit to transmit or receive with a phase shift relative to said reference group.

In some exemplary embodiments of the system the phase shift is programmable or hard coded.

In some exemplary embodiment of the system phased array antenna frame comprises at least two substantially linear one dimensional arrays of radiators.

In some exemplary embodiment of the system the phased array antenna frame comprises an even number of substantially linear one-dimensional arrays of radiators, wherein each substantially linear one-dimensional array of radiators consists of two power of N radiators, where N is an integer greater than 1.

In some exemplary embodiment of the system the phased array antenna frame includes radiators that are substantially hexagonal in shape.

In some exemplary embodiment of the system the system is selectively switching between different radiation modes associated with each group of radiators.

In some exemplary embodiment of the system a radiation mode is defined according to the number of groups of radiators that transmit and receive in different phase shift and according to said programmable phase shift.

In some exemplary embodiment of the system the phased array circuit controls said phased array antenna frame to radiate in a horizontal beam aperture.

In some exemplary embodiment of the system the horizontal beam aperture width is substantially from 3 to substantially 15 degrees.

In some exemplary embodiment of the system the system is adapted to communicate with multiple wireless area network devices.

In some exemplary embodiment of the system the system is adapted to communicate with Personal Computers.

In some exemplary embodiment of the system the system is adapted to communicate with at least one TV device.

In some exemplary embodiment of the system the programmable phase shift is +/−180 degrees.

In some exemplary embodiment of the system the programmable phase shift is +/−180 degrees and the programmable phase shift is created by using transmission lines for inversing the signal phase.

In some exemplary embodiment of the system the wireless area network compliant signals are transmitted in the about 57 to about 64 GHz band.

In some exemplary embodiment of the system the system is selectively switching between two radiation modes.

In some exemplary embodiment of the system the system is selectively switching between two radiation modes and wherein the phased array antenna frame comprises two linear one-dimensional arrays of radiators.

In some exemplary embodiment of the system the system is selectively switching between different radiation modes according to the level of signals that are received in said different phase modes.

In some exemplary embodiment of the system the horizontal beam aperture is steered horizontally according to a programmable pattern.

In some exemplary embodiment of the system the transmitting and receiving wireless area network compliant signals from or to wireless area network devices is optionally performed through building walls.

In accordance with a preferred embodiment of the present method, there is provided a method for implementing a wireless communication comprising the steps of providing at least one phased array antenna frame and phased array antenna circuit connected to the at least one phased array antenna frame; and controlling said at least one phased array antenna frame by said phased array antenna circuit to transmit and receive wireless personal area network compliant signals from or to wireless area network devices.

BRIEF DESCRIPTION OF THE DRAWINGS

The present invention will be understood and appreciated more fully from the following detailed description taken in conjunction with the drawings. Identical structures, elements or parts, which appear in more than one figure, are generally labeled with a same or similar number in all the figures in which they appear, wherein.

DETAILED DESCRIPTION OF THE INVENTION

Patent applications serial number PCT/IL2006/001144 filed on Oct. 3, 2006 and in PCT/IL2006/001039 filed on Sep. 6, 2006 the disclosures of which are incorporated herein by reference describe elements and circuit designs for providing low cost and light weight distributed T/R multi-module for active phased array antennas.

The applications describe circuits, which can be implemented as low cost and small sized circuits or manufactured as integrated chips to generate and control the signals transmitted and detected by phase array antennas. The current application implements the concepts described in the above applications to provide suitable phase array antennas for implementing the current invention as further described below.

Figure 1A:
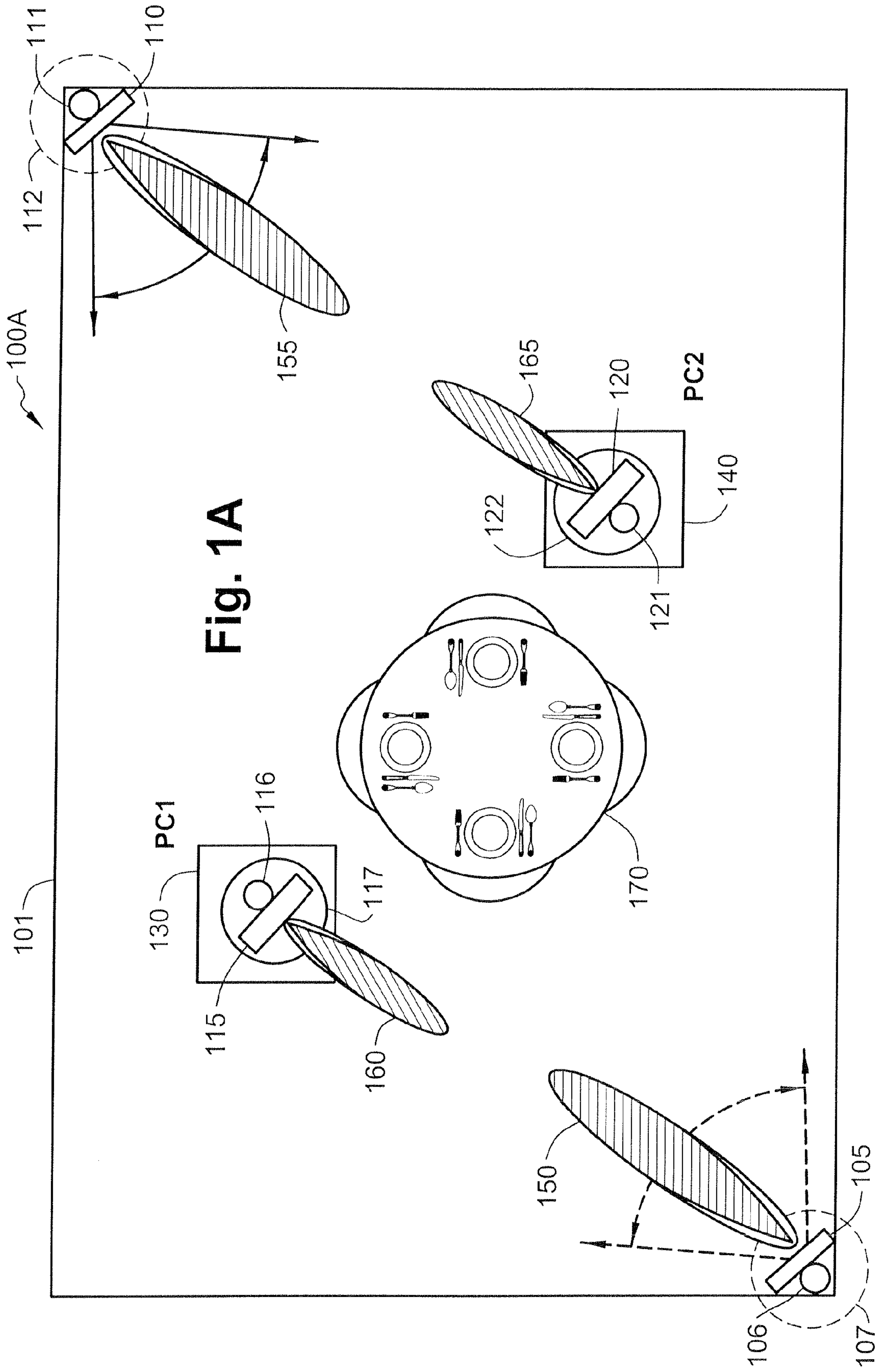
FIG. 1A is a top view illustration of a room with two fixed phased array antenna systems and two PCs with phased array antenna system according to an exemplary embodiment of the invention.

FIG. 1A shows a top view of a phased array antenna system deployment according to the invention 100A. FIG. 1 shows a living room 101 where two PCs 130, 140 are located at different sections of the room. Each PC is equipped with one phased array antenna system 117, 122 respectively. Each phased array antenna system includes a phased array antenna frame 115, 120 respectively, and a phased array antenna control and driving circuit 116 and 121 respectively (hereinafter "phased array antenna circuit").

In an exemplary embodiment of the invention there are two fixed phased array antenna systems 107, 112, located at different corners of the room. Each of the systems 107 and 112 also includes a phased array antenna frame 105, 110 respectively, and a phased array antenna circuit 106 and 111 respectively.

Each of the phased array antenna frames is transmitting and/or receiving data. The ellipses 150, 160, 155 and 165 are schematic representations of the radiation patterns of the phased array antenna frames 105, 115, 110 and 120 respectively. It should be noted that the ellipses are general illustrations intended to describe a general beam direction and a coarse representation of the beam width. However it does not intend to provide a quantitative representation of the beam pattern. This comment refers also to the ellipses shown in FIGS. 1B 1C 1D and 3.

In an exemplary embodiment of the invention a phased array antenna system 107 is steering its beam 150 horizontally (azimuth steering) until it reaches an optimal reception level from the phased array antenna system 117. The same procedure also applies for the phased array antenna system

117 which performs a horizontal steering of its beam 160 until acquiring an optimal reception level from the phased array antenna system 107.

The same procedure applies also to the phased array antenna systems 112 and 122.

It should be noted that the narrow horizontal beam aperture and the low side lobes of a phased array antenna system according to the invention guarantee the ability to avoid the event of locking on side lobes.

Optionally, once an optimal level of signal reception is reached, the phased array antenna system memorizes the azimuth for enabling a quick initialization at later power-on events.

As can be noticed, using only two systems the entire area of a rectangular room can be covered.

Figure 1B:
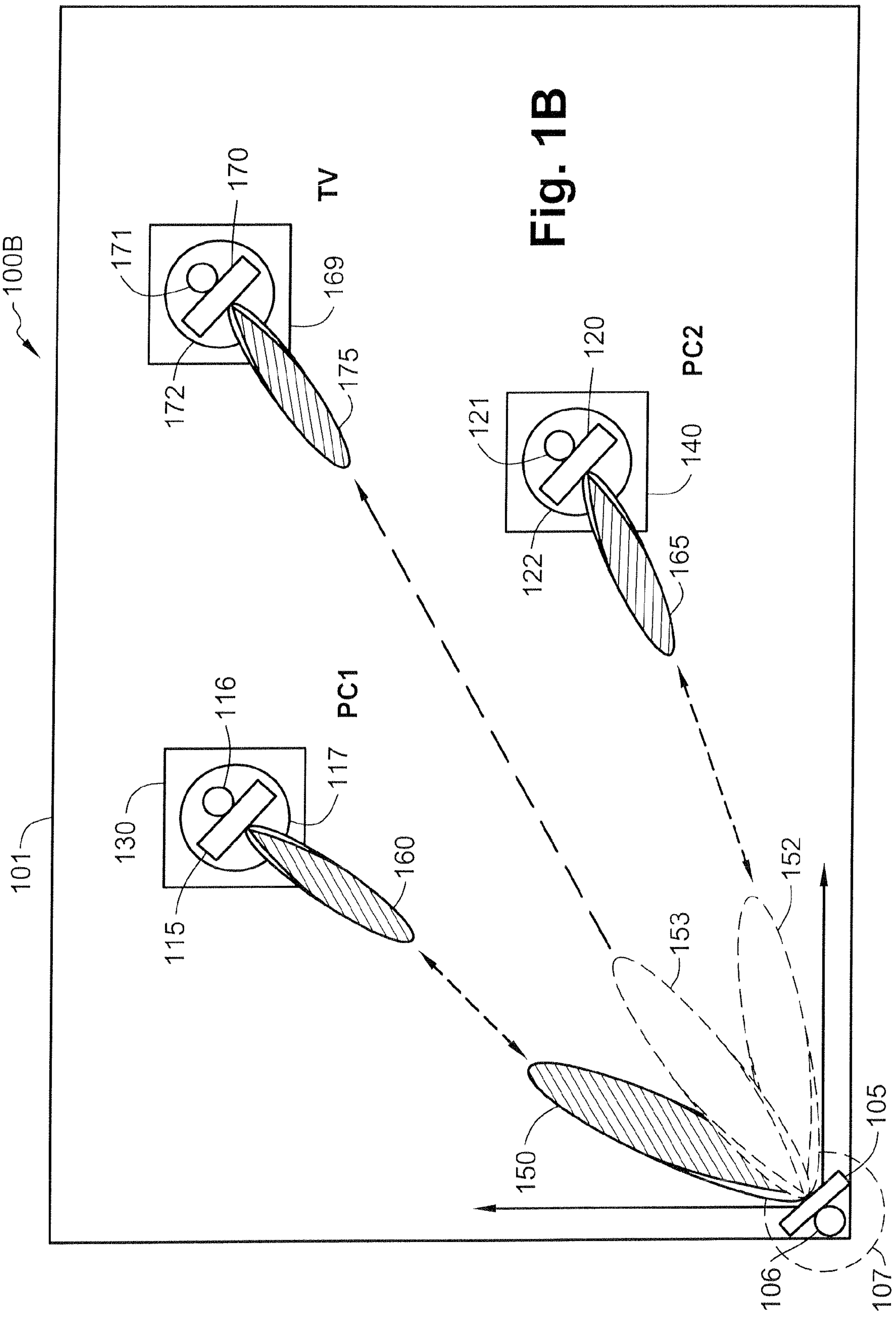
FIG. 1B is a top view illustration of a room with one fixed phased array antenna system and several PCs with phased array antenna system according to an exemplary embodiment of the invention.

In another exemplary embodiment of the invention a single phased array antenna system 107 as shown in FIG. 1B is communicating with Three phased array antenna systems 117, 122 and 172 the phased array antenna systems 117 and 122 are connected to a PC device 130 and 140 respectively and the phased array antenna system 172 is connected to a TV device 169.

The ability of the systems to interact independently is obtained by beam steering of all the antennas as will be further described. In order to transmit and receive data from multiple phased array systems, the phased array system 107 performs an azimuthally steering and electronically rotates between three positions indicated by the ellipse 150 that points to the PC 130, the ellipse 152 that points to the PC 140 and ellipse 153 that points to TV 169. After the locking transient between the fixed system and the PC/TV/cell phone etc, the communication with the PC devices is typically bidirectional, while the communication with the TV may be unidirectional, where the TV phased array antenna system may only receive data.

It should be remembered that the antenna steering by a phased array antenna system is extremely fast, typical duration of switching from a first beam direction 150 to a second beam direction 152 or 153 is in the order of magnitude of micro seconds.

It will be appreciated by persons skilled in the art that a single phased array antenna system is able to communicate simultaneously with a multiple of WPAN devices on a time sharing base, where the limit on the number of devices is dictated by the bandwidth requirements of the devices and the bandwidth capability of the phased array antenna system. While FIG. 1B shows a phased array antenna system 107 communicating with three phased array antenna systems 117 and 122 it is possible that the phased array antenna system 107 will also communicate with any WPAN compliant device other than phased array antenna system.

Figure 1C:
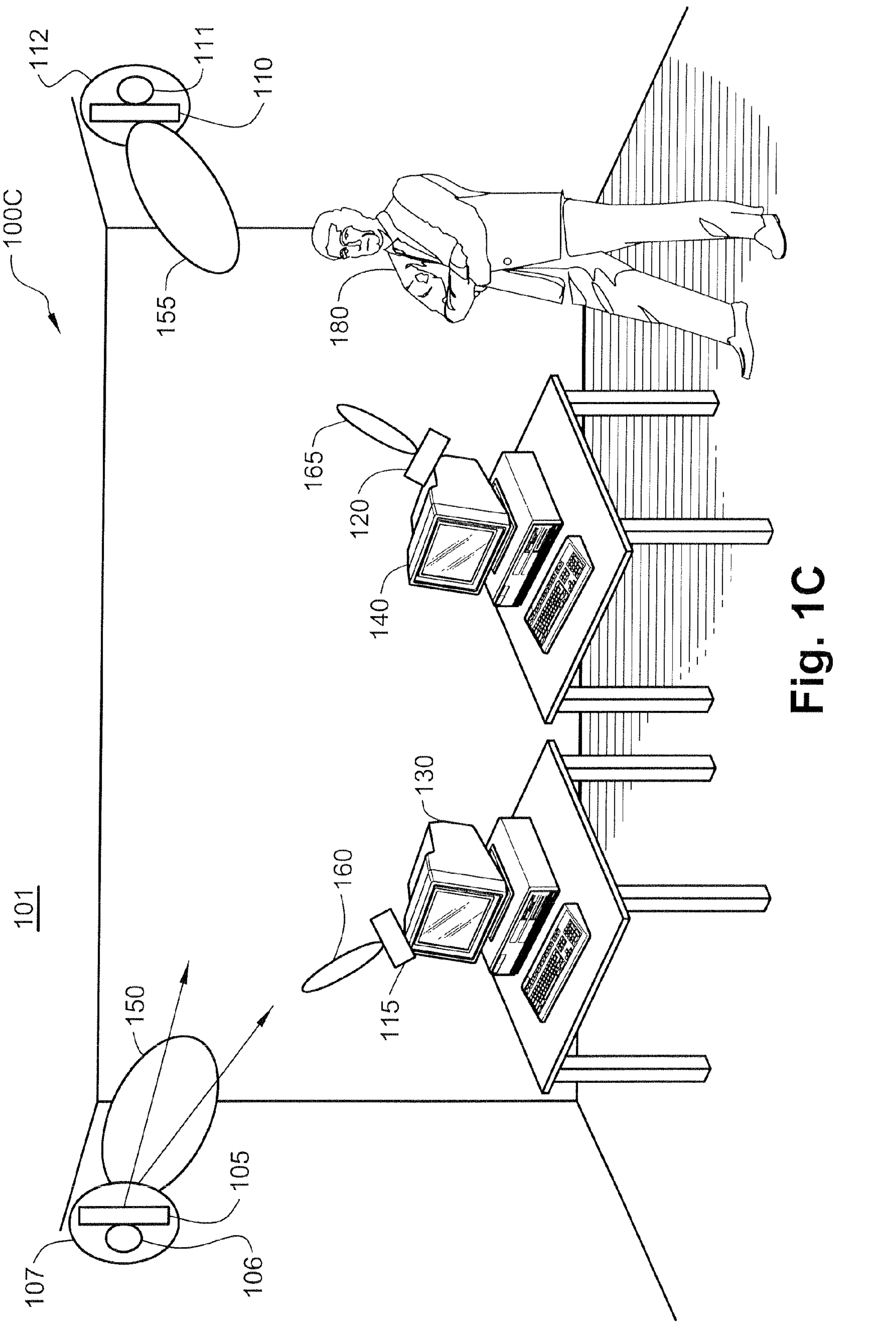
FIG. 1C is a front view illustration of a room with two fixed phased array antenna frames and two PCs with phased array antenna system, in a first radiation mode, according to an exemplary embodiment of the invention.

FIG. 1C shows the same room 101 from the front in order to describe the phased array antenna beam in the vertical plan. FIG. 1C shows the beam vertical cross section when operating in a first mode of radiating. In the first mode of radiating there is one main lobe of radiating e.g. 150,155,160 and 165, the lobe has an aperture of around 30 degree in the vertical plan, which should provide good coverage when there is a clear line of sight between two communicating devices. However in a dynamic environment, when obstacles, e.g. a person moving across the room, may obscure the line of sight between communicating devices, another approach is required.

Figure 1D:
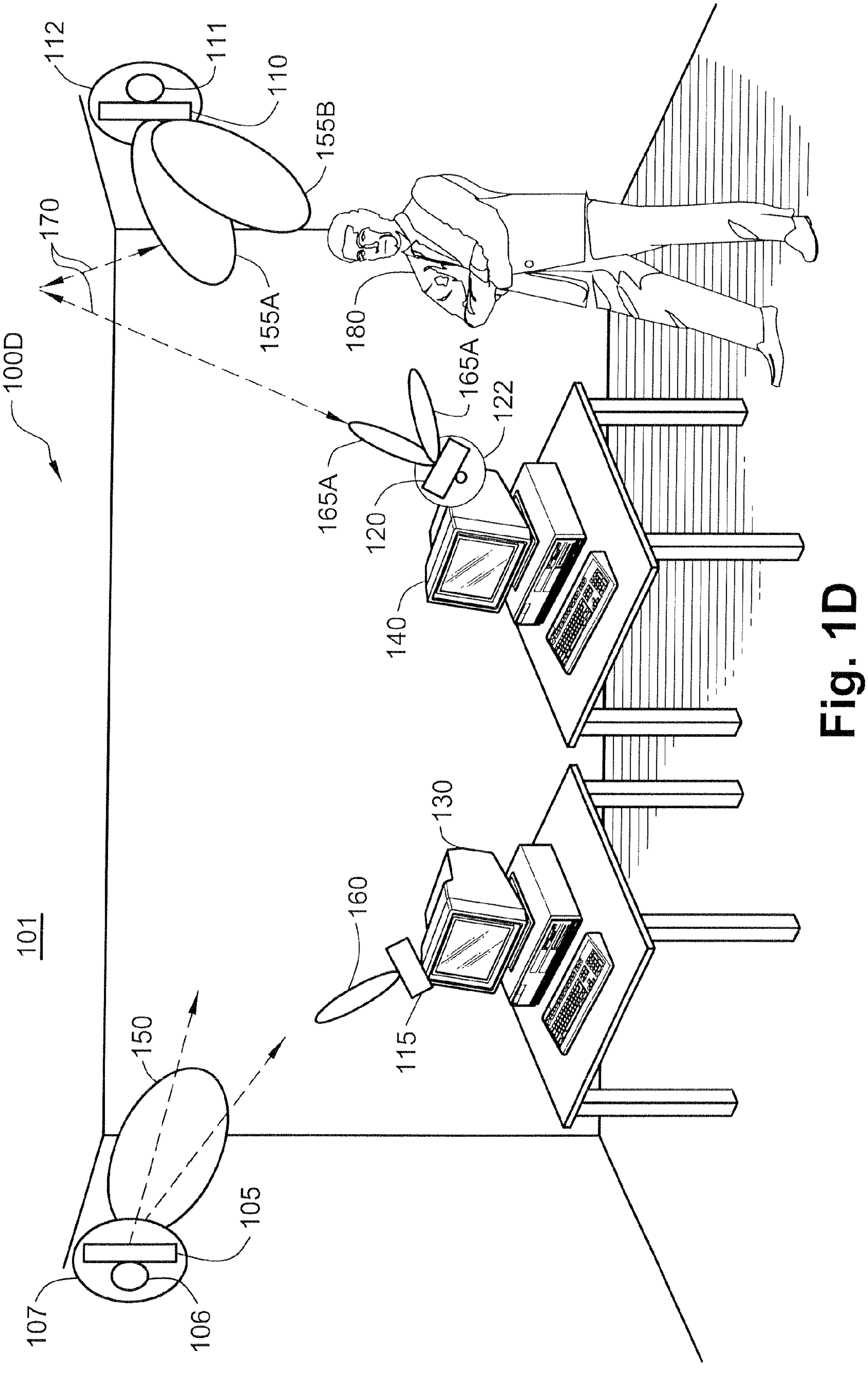
FIG. 1D is a front view illustration of a room with two fixed phased array antenna frames and two PCs and a TV with phased array antenna systems, in a second radiation mode, according to an exemplary embodiment of the invention.

FIG. 1D shows the same room 101 when a person 180 breaks the line of sight between the two phased array antenna systems 112 and 122. FIG. 1D shows that when the system detects deterioration of signal level reception it switches to a second mode of radiation, where each of the single main lobes 165 and 155 splits to two main lobes, i.e. 155 splits into 155A and 155B, and 165 splits into 165A and 165B. The two main lobes that are radiated by the phased array antenna frame are intended to transmit and receive radiation by indirect path, namely to enable transmission and reception of electromagnetic echo from the environment, mainly from surrounding walls, e.g. the path indicated by the broken line marked with numeral 170.

Figure 1E:
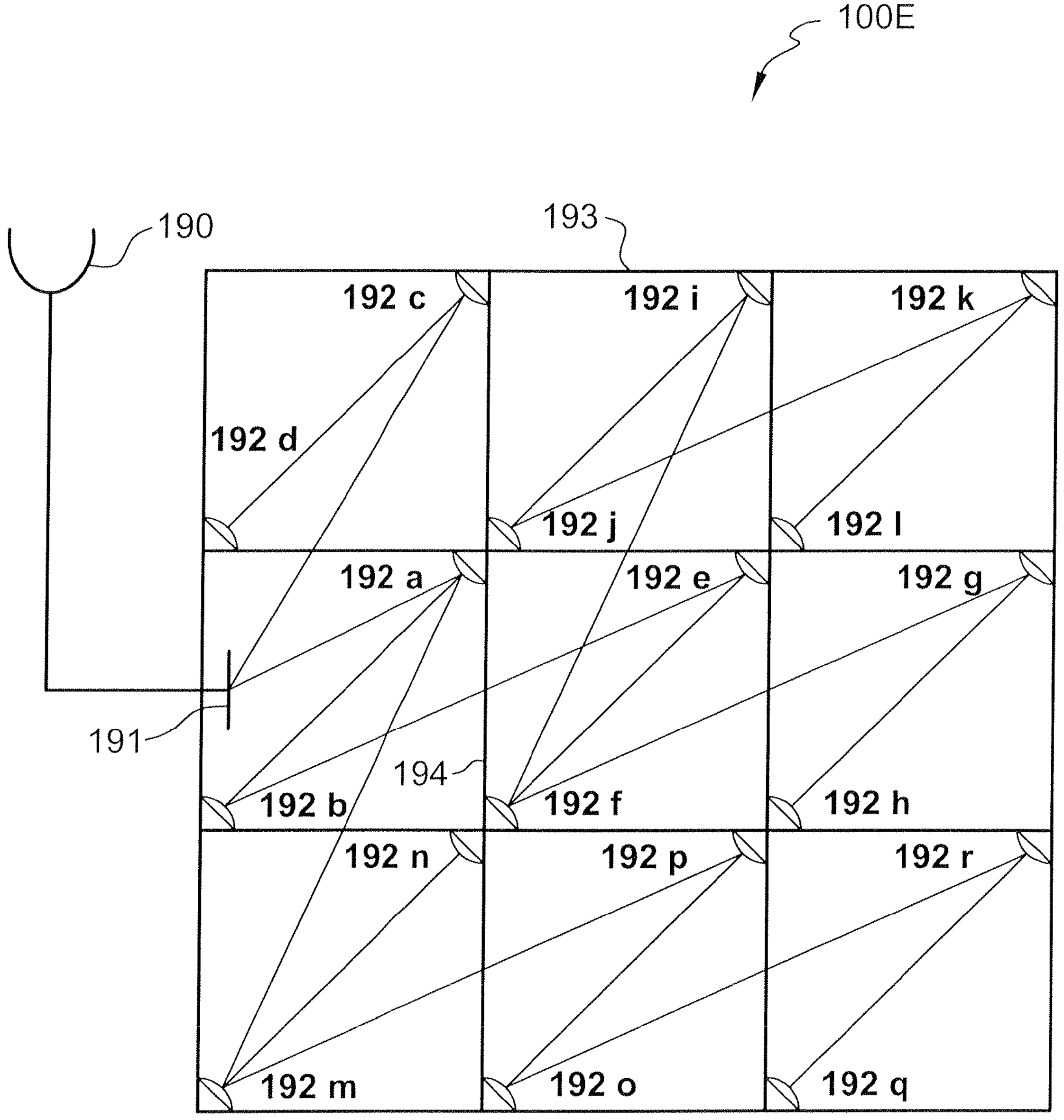
FIG. 1E is a top view illustration of signal distribution among the rooms on a same floor, according to an exemplary embodiment of the invention.

FIG. 1E shows a signal distribution among nine rooms 193 on the same floor 100E. In the input bound the signal is intercepted by an antenna 190 and received by a master phased array antenna 191. The signal is transmitted and received by the set of phased array antennas 192*a*-192*r*. As shown in FIG. 1E the signal is transmitted and received across room walls, for example when transmitted from the phased array antenna 192*b* to 192*e* while crossing the wall 194. The relative low attenuation of high frequency radiation provides the ability to cross common room walls such as concrete, plywood, clay brick, glass and the like. For example, the attenuation of a 5.8 GHz signal caused by a typical concrete wall is about 7 dB. Thus, a single master and a set of phased array antennas can provide full wireless coverage for an entire door. The output bound is symmetric but on the opposite direction.

It should be noted that the phased array antennas 192*a*-192*r* are adapted to serve also as repeaters in order to compensate on the attenuation of the signal along its path, while the technique of signal distribution by a set of repeaters is known in the art its detailed description is omitted.

Figure 2A:
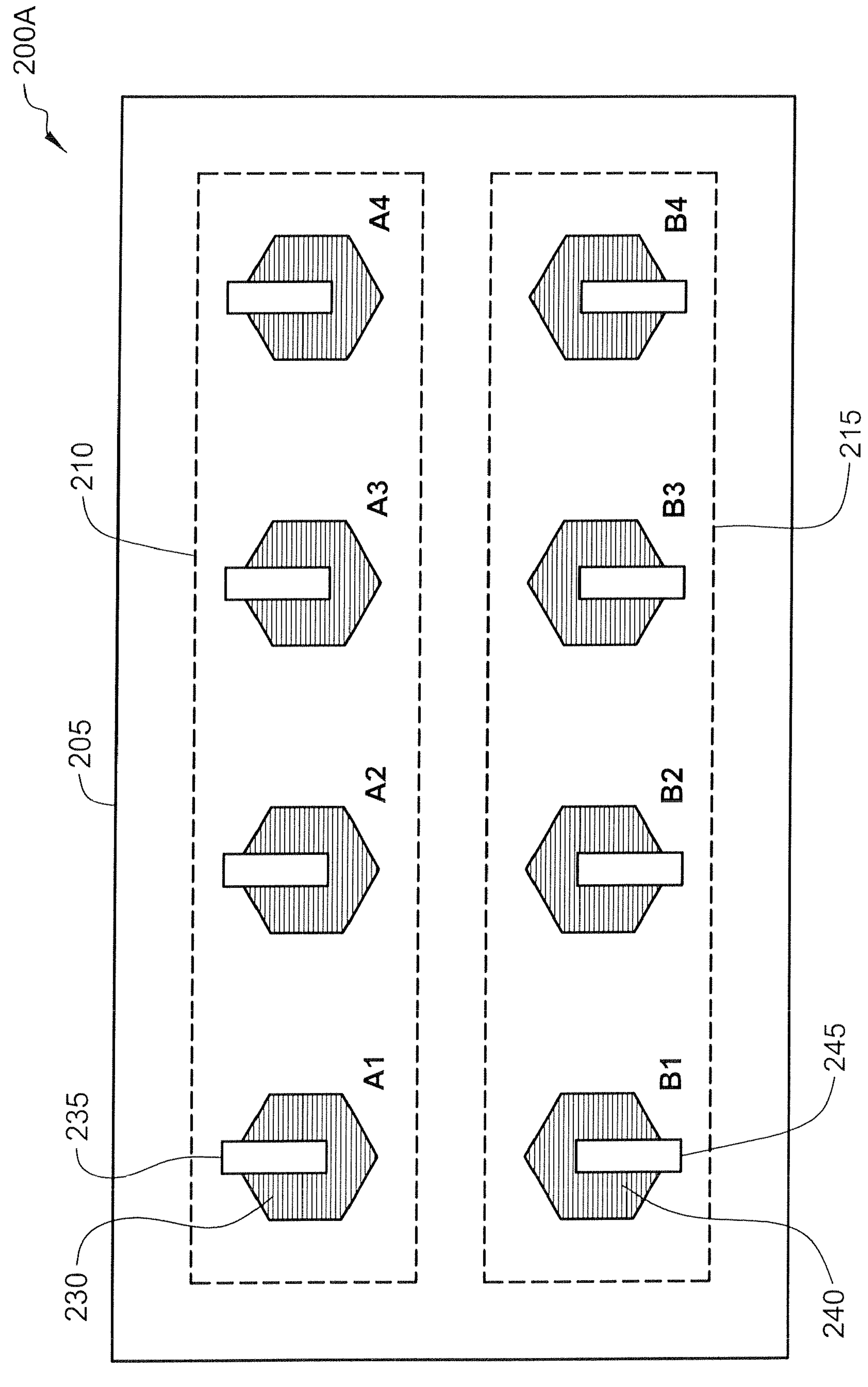
FIG. 2A is a schematic illustration of a phased array antenna frame according to an exemplary embodiment of the invention.

FIG. 2A shows a radiating part of a distributed active phased array antenna (APAA) (referred to as "phased array antenna frame") 200A that includes two one-dimensional arrays of micro-strip radiators (referred to as "radiators") 210, 215 located on a rectangular casing 205, consisting on a dielectric substrate with the related base plate. The one-dimensional arrays of radiators consist of 8 radiators marked as A1 to A4, B1 to B4. Each radiator is shaped as a hexagonal patch, for example radiator A1, 230. Each radiator has a feeder (an I/O port that conveys the electromagnetic wave to and from the radiator) 235, 245 either at the upper vertex of the radiator (A1 to A4), or at the lower vertex of the radiator (e.g. B1 to B4). The hexagonal shape of the radiator has been shown by simulation to provide better results than a square radiator or a circular radiator, in terms of transmission gain and/or receiving gain and also by providing better isolation between adjacent radiators, for the same distance between them.

In an exemplary embodiment of the present invention, the positioning of the radiator's feeder forms a symmetric structure. In the first one-dimensional array of radiators the radiator's feeders are located at the upper vertex of the hexagonal patch, while at the second one-dimensional array of radiators the radiator's feeders are located at the lower vertex of the patch. It should be noted that this symmetric positioning of the radiator's feeder optionally contributes to improving the symmetry of the radiation pattern.

The antenna dimensions depend on the wave's frequency and the dielectric constant of the substrate. As an example, a WPAN radiator at 60 GHz, implemented on substrate with dielectric constant 6, has dimensions in the order of magnitude of about one millimeter. This compact embodiment enables the inclusion of the phased array antenna described in this invention in various hand-held devices such as palm-computers, Personal data Organizers (Blackberry), Cellular Phones, notebook computers, etc.

In an exemplary embodiment of the invention, to achieve wider coverage angle with still high power density for communicating with the device described in FIG. 2A, different radiation patterns (referred to as "radiation modes") arc generated with the same physical array of radiators.

Optionally, production of the multiple radiation modes by antenna 200 is defined by the relative phase shift to a signal among the two one-dimensional arrays of radiators 210, 215.

In an exemplary embodiment of the present invention, a first radiation mode is defined by providing the requested phases to the two one-dimensional arrays of radiators 210 and 215, in such a way that there is no phase difference between every element "A" of the first one-dimensional array and the correspondent element "B" of the second one-dimensional array. A second radiation mode is defined by providing the requested phases to the two one-dimensional arrays of radiators 210 and 215, in such a way that there is phase difference of 180 degrees between every element "A" of the first one-dimensional array and the correspondent element "B" of the second one-dimensional array.

It should be noted that it is possible to both transmit and receive via the same radiators and it is sometimes more efficient architecture. However in an exemplary embodiment of the invention, the transmission and receiving is split between transmitting radiators and receiving radiators. Deployment of different radiators for transmission and receiving may be carried out in various topologies, such as separating the functions to two different phased array frames or alternatively define sub groups of the radiators in a phased array frame for transmission while the complementary sub group is used for receiving.

It should be noted that in order to create the two radiation modes as mentioned above and when using the phased array antenna control and driving circuit as will be further described, the phased array antenna frame should be positioned horizontally, as shown in FIG. 2A.

Figure 2B:
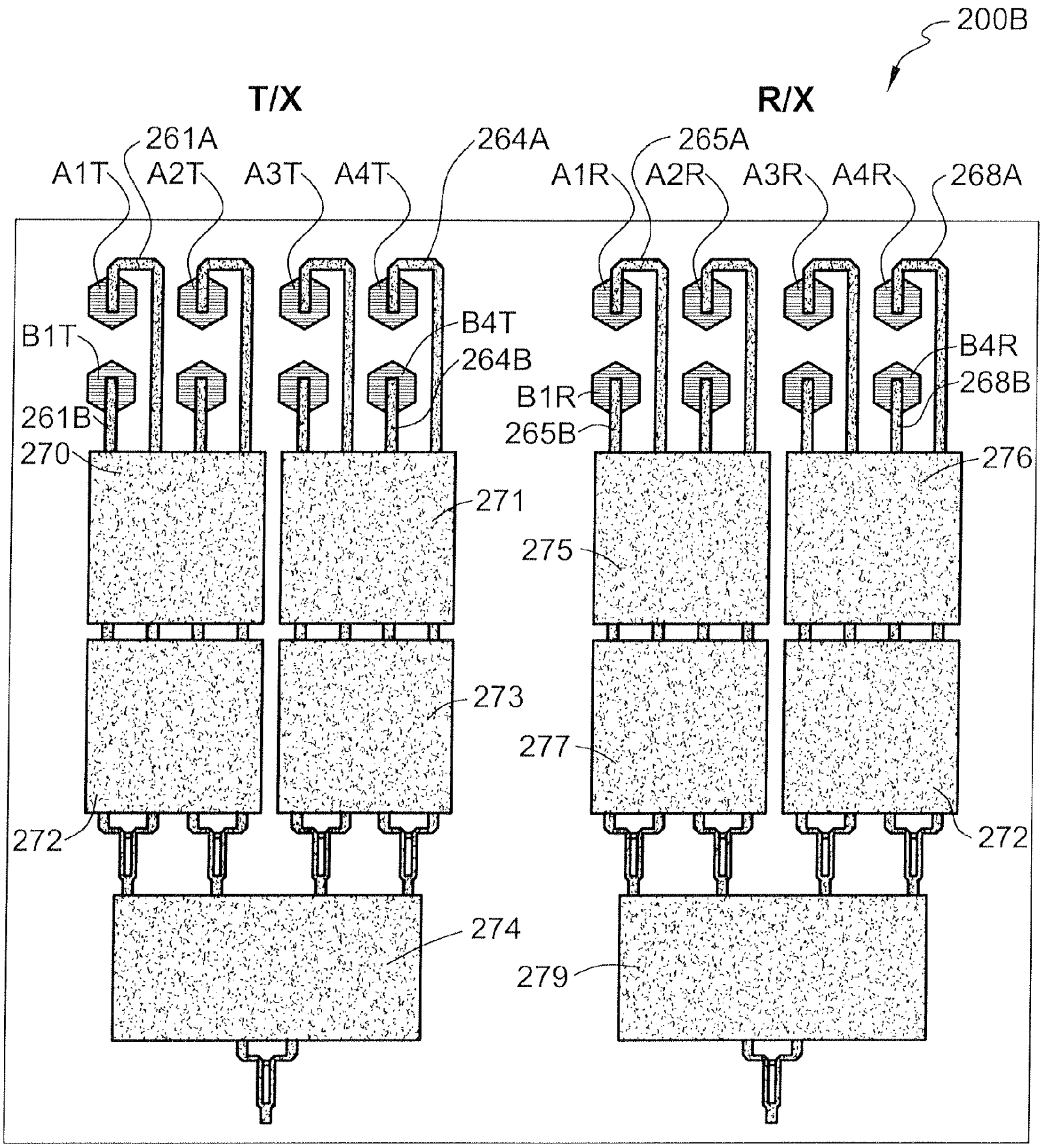
FIG. 2B is a schematic illustration of a phased array antenna frame that is composed of separate units for receiving and transmitting, according to an exemplary embodiment of the invention.

FIG. 2B shows a schematic view of a phased array antenna transceiver where transmission and receiving is conducted by two separate units according to an exemplary embodiment of the invention. As will be further described, separation of the receiving unit and the transmitting unit is expected to provide technical and economical advantages when the radiating frequency is relatively high.

The receiving and transmitting units have basically the same structure. FIG. 2B shows the transmitting unit on the left side with transmitting radiators A1T-A4T and B1T-B4T. The receiving radiators are shown on the right side of FIG. 2B marked A1R-A4R and B1R-B4R. The feeders of the transmitting unit are marked 261*a*-264*a* and 261*b*-264*b*, and the feeders of the receiving unit are marked 265*a*-268*a* and 265*b*-268*b*.

FIG. 2B further shows a schematic view of the connection between silicon chips 270-279 that contain the electronic circuits that provide the antenna control (referred to as phased array circuit).

Micro strip lines 261*a*-268*a* 261*b*-268*b* of defined length are the feed of the radiators, and lays on the upper surface of a dielectric substrate (not shown). The hexagonal patches are laying on the upper surface of a second substrate (not shown), overlapping the previous one, such that there will be an efficient electro magnetic transfer of energy from the feeds to the patches.

The difference between the transmitting and receiving units is not shown in FIG. 2B. However in the transmitting unit, the feeders 261*a*-264*a* and 261*b*-264*b* serve for transferring the carrier generated and handled by the circuits 270-274 to the radiators A1T-A4T B1T-B4T, while in the receiving unit the signal, received through the radiators A1R-A4R, B1R-B4R, will be down converted to base band by the signal generated and handled by the circuits 275-279.

The circuits defined as 270-274 and 265-279 in FIG. 2B are described in details in the applications referred to above.

Figure 3A:
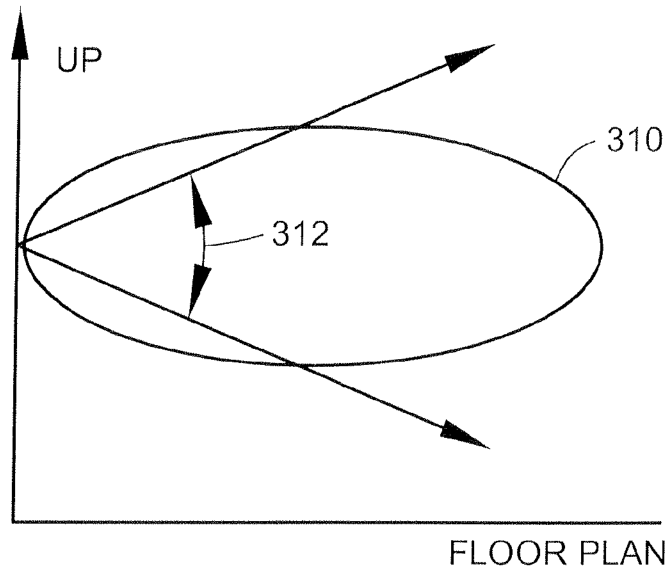
FIG. 3A is a side view of the radiation pattern of a phased array antenna frame in a first mode of operation according to an exemplary embodiment of the invention.

FIG. 3A shows a side cross sectional view of the radiation pattern that is created by the first radiation mode. The radiation pattern 310 has a vertical aperture of about 30 degree 312, which is wide enough to cover static devices that may reside in a typical room either at home or in an office at the height of a standard table. The beam is intended not to be steered in elevation, so that the section of FIG. 3A is intended to be standing.

Figure 3B:
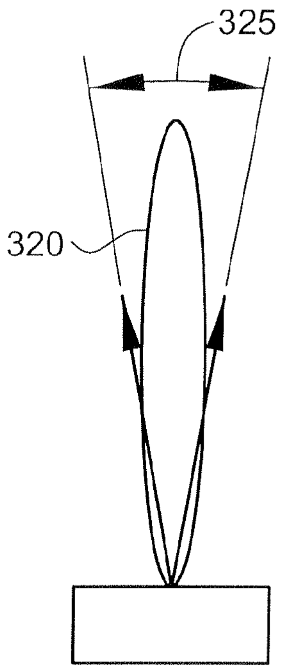
FIG. 3B is a top view of the radiation pattern of a phased array antenna frame in a first mode of operation according to an exemplary embodiment of the invention.

FIG. 3B shows a top cross sectional view of the radiation pattern 320 that is created by the first radiation mode. The radiation pattern has a horizontal aperture of about 5 degree 325. It should be noted that a narrow horizontal beam aperture enables to concentrate the power in a narrow angle, with low side lobes level. The beam is intended to be steered in azimuth, so that the section of FIG. 3B is intended to sweep a wide azimuth angle.

Figure 3C:
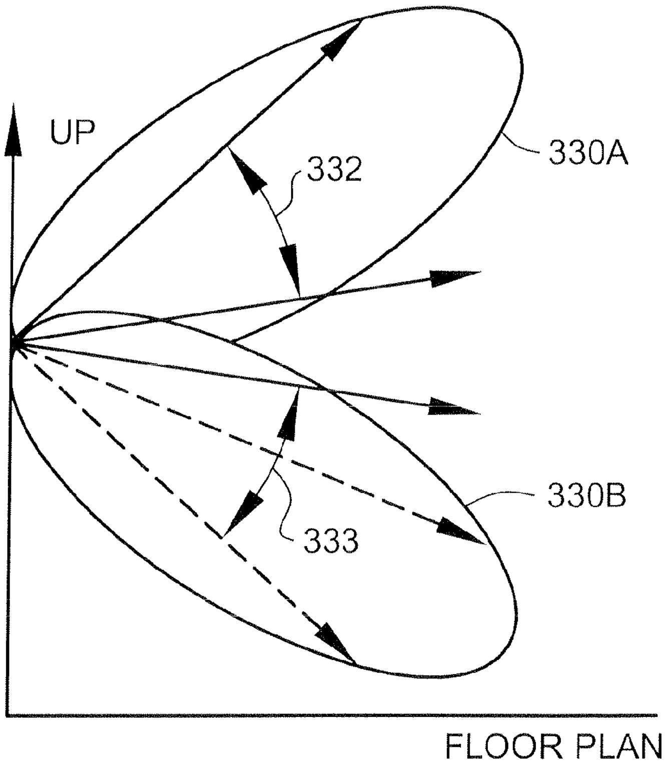
FIG. 3C is a side view of the radiation pattern of a phased array antenna frame in a second mode of operation according to an exemplary embodiment of the invention.

FIG. 3C shows a side cross sectional view of the radiation pattern that is created by the second radiation mode. The radiation pattern has two main lobes 330A and 330B. In an exemplary embodiment of the invention the second mode of radiation radiates the same amount of power of the first mode, but the gain of each lobe is half the gain of the first mode. However this mode results with wide spread distribution of the radiated data (as well as wide angles for reception of data), to enable indirect communication. The two main lobes created at the second mode of radiation are targeted to both the floor and the ceiling, and part of the radiation is reflected from the ceiling and floor (as well as from other objects in the room) reaches the target antenna.

The beam is intended not to be steered in elevation, so that the section of FIG. 3C is intended to be standing.

Figure 3D:
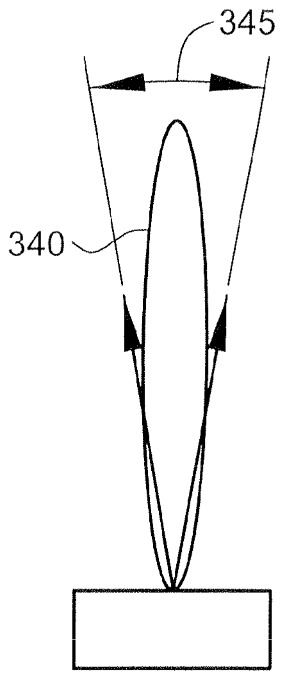
FIG. 3D is a top view of the radiation pattern of a phased array antenna frame in a second mode of operation according to an exemplary embodiment of the invention.

FIG. 3D shows a top cross sectional view of the radiation pattern that is created by the second radiation mode. However in the horizontal plan, the radiation patterns of the first and second mode of radiation have the same aperture, and therefore FIG. 3D shows the same geometrical shape.

The beam is intended to be steered in azimuth, so that the section of FIG. 3D is intended to sweep a wide azimuth angle.

With reference to FIG. 2A:

The first mode of radiation, (FIGS. 3A & 3B), is generated when the signals at the radiators A1-A4 (FIG. 2A) and corresponding B1-B4 (FIG. 2A) have phase difference of 0 degrees.

The second mode of radiation, (FIGS. 3C & 3D), is generated when the signals at the radiators A1-A4 (FIG. 2A) and corresponding B1-B4 (FIG. 2A) have phase difference of 180 degrees.

Figure 4:
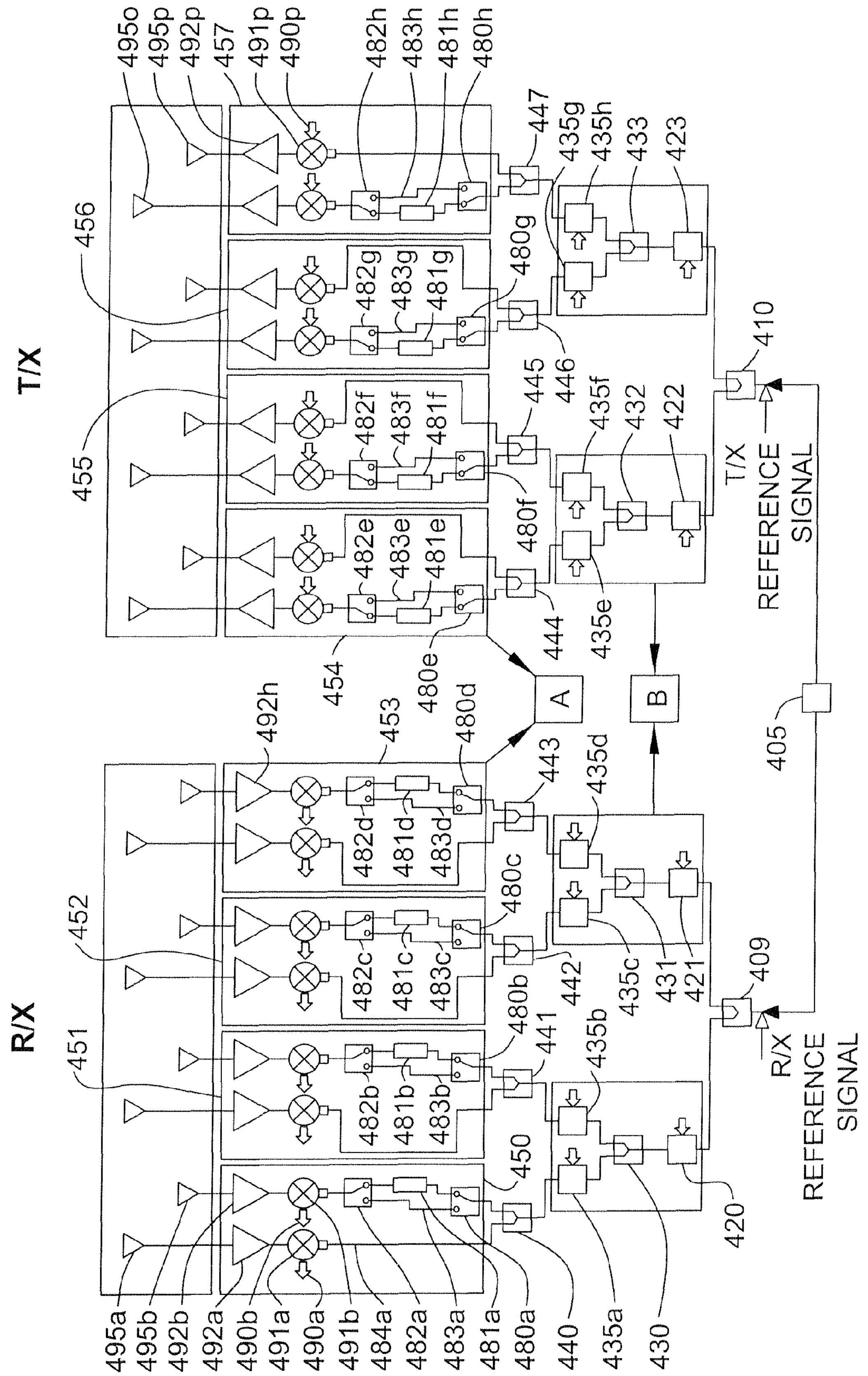
FIG. 4 is a schematic illustration of a circuit for implementing a phased array antenna circuit that supports a combination of two modes of operation according to an exemplary embodiment of the invention.

FIG. 4 is an exemplary illustration of the base of a circuit for providing the carrier signals to an array of radiators, according to an exemplary embodiment of the invention.

While at relatively low frequencies it is commercially more effective to use the same antenna for both receiving (R/X) unit and transmitting (T/X) unit, at the higher frequencies like the 60 GHz the circuitry connected to this function involve semiconductor real estate not compatible with the small size of the array of radiators, so that it will be preferable to separate the T/X and R/X functions in two different subsystems. As will be further described, the differences between the physical structure of the transmitting unit and a receiving unit are minor, as long as the only different functions are the UP-converter for the T/X 491*i*-491*p*, and the DOWN-converter for the R/X.

491*a*-491*h*. They are basically the same circuit, but used in different ways. The UP-converter is located at the input of the T/X power amplifier, while the DOWN-converter is located at the output of the R/X low noise amplifier.

The circuit uses an oscillator unit 405 whose output is provided to two splitting units 409, 410. The power divider 409 provides the reference signal to the R/X unit while the power divider 410 provides the reference signal to the T/X unit. The following description will mainly refer to the R/X unit-expanding the description to the T/X unit only where there are substantial differences. The signals then arrive to a first level of PSIPPO (phase shift push-push oscillator) 420-421. Persons skilled in the art will readily appreciate that the phase shift that is determined at this level of PSIPPO serves to steer the beam.

The signal then passes through another level of splitting elements 430-431 (power splitters) and proceeds to a second level of PSIPPO 435*a*-435*d*. Persons skilled in the art will readily appreciate that the phase shift that is determined at this level of PSIPPO contributes in steering the beam. Applying a zero degree phase shift at the first 420, 421, and second level 435*a*-435*d* of PSIPPO results in a substantially vertical beam, where its symmetry axis is perpendicular to the antenna surface.

At the next stage the signals are delivered to four power splitters 440-443 and then proceed to the multi-function blocks 450-453. As long as the mentioned blocks have the same structure, only one phase shift unit 450 is described.

The block 450 consists of two branches, each one connected to radiators 495*a* & 495*b*. With reference to FIG. 2A, the mentioned radiators are A1 & B1. The branch 484*a* delivers the carrier signal to the connected mixer with a certain phase. The second branch, 480*a*-482*a*, delivers the same signal to the connected mixer with a phase equal to branch 484*a*, or shifted by 180 degrees, depending on the position of the switches 480*a* & 482*a*. This way the array of radiators will be able to generate the two radiation modes described above. Optionally the transmission line 481*a* applies a phase shift that is greater or smaller than 180 degrees. The down converter mixers 491*a*, 491*b* get signals that were received in the antenna patch 495*a*, 495*b* respectively and were amplified by the low noise amplifiers 492*a*, 492*b* respectively and produce the incoming signal 490*a*, 490*b* respectively.

The T/X path differs from the R/X path by that the mixers are up converter mixers 491*i*-491*p* that receive the data signals 490*i*-490*p* and produce an outgoing signal that goes to the antenna patches 495*i*-495*p* after being amplified by the amplifiers 495*i*-495*p*.

The phase difference between the two branches can be accomplished, in principle, by inserting an additional level of PSIPPO before each mixer. Though, this solution will involve a higher number of components.

It should be noted that the delay elements 481*a*-481*h* are simple and low cost transmission lines, as are the electronic switches 480*a*-480*h* 482*a*-482*h*. The usage of electronic switches and delay elements reduces both cost and size, compared to the solution with an additional level of PSIPPO.

In another exemplary embodiment the path from the splitter 440 to the down converter mixer 490*a* (and all the equivalent paths) also includes an optional phase shift path, enabling the circuit to be programmed for more phase shift combinations.

In some embodiments of the invention, the WPAN phased array antenna system will switch between more than two radiation modes, using an equal or different number of linear arrays of radiators.

In some embodiments of the invention, the WPAN phased array antenna system may provide a phase shift that is greater or smaller than 180 degrees to the one-dimensional arrays of radiators.

In some embodiments of the invention, the WPAN phased array antenna system may include more or less than two one linear arrays of radiators.

In some embodiments of the invention, the WPAN phased array antenna system may include various combinations of radiators other than linear arrays of radiators, where any sub-group of the radiators will be associated with a programmable phase shift with reference to any reference sub-group.

In some embodiments of the invention, the WPAN phased array antenna system may include radiation modes where the azimuth angle beam is narrower or wider than the one that was described in the foregoing description.

In some embodiments of the invention, the WPAN phased array antenna system may include radiation modes where the vertical beam aperture is narrower or wider than the one that was described in the foregoing description, and where the vertical beam distribution is different from the forms that were described in the foregoing description.

In some embodiments of the invention, the WPAN phased array antenna system may perform a periodical horizontal antenna steering to search for transmitting devices that should be communicated by the system.

While operating the WPAN phased array antenna system according to an exemplary embodiment of the invention, the system switches among the two radiation modes. The switching may be a periodic switching pattern or any desired pattern. In an exemplary embodiment of the invention, the system is able to alter the switching pattern to accommodate dynamic situations, for example when receiving or transmitting sources join or leave the area that is covered by the system, or when different needs and priorities are required. Optionally, alteration of the switching pattern provides priority in coverage of one area over another, for example to increase the bandwidth to a specific client device.

The use of radiation modes where the phase shift between the one-dimensional arrays of radiators is either zero degrees or 180° enables to simplify the electronic circuits that support the transmission and receiving in the WPAN compliant phased array system as shown in FIG. 4.

It should be appreciated that the above described methods and systems may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

It will be appreciated by persons skilled in the art that the present invention is not limited to what has been particularly shown and described hereinabove. Rather the scope of the present invention is defined only by the claims, which follow.

The invention claimed is:

1. A wireless area network communication system comprising:

at least one phased array antenna frame, a phased array antenna circuit connected to the at least one phased array antenna frame wherein said phased array circuit and said at least one phased array antenna frame are adapted to transmit and receive wireless area network compliant signals from or to wireless area network devices; and wherein said phased array antenna circuit comprises a plurality of phased shifted locked injected push-push oscillator (PSIPPO).

2. The system according to claim 1 wherein the at least one phased array antenna frame transmits or receives radiation.

3. The system according to claim 1 wherein the phased array antenna circuit is for driving and controlling said at least one phased array antenna frame.

4. The system according to claim 1 wherein the wireless area network is a wireless personal area network.

5. The system according to claim 1, wherein said at least one phased array antenna frame comprises at least two groups of radiators.

6. The system according to claim 5 wherein one of said at least two groups of radiators is defined as a reference group.

7. The system of claim 6 wherein one of said at least two groups of radiators is controlled by said phased array circuit to transmit or receive with a phase shift relative to said reference group.

8. The system of claim 7 wherein the phase shift is programmable or hard coded.

9. The system according to claim 1, wherein said at least one phased array antenna frame comprises at least two substantially linear one dimensional arrays of radiators.

10. The system according to claim 1, wherein said at least one phased array antenna frame comprises an even number of substantially linear one-dimensional arrays of radiators, wherein each substantially linear one-dimensional array of radiators consists of two power of N radiators, where N is an integer greater than 1.

11. The system according to claim 1, wherein said at least one phased array antenna frame includes radiators that are substantially hexagonal in shape.

12. The system according to claim 5, wherein the system is selectively switching between different radiation modes associated with each group of radiators.

13. The system according to claim 12, wherein a radiation mode is defined according to the number of groups of radiators that transmit and receive in different phase shift and according to said programmable phase shift.

14. The system according to claim 1, wherein said phased array circuit controls said phased array antenna frame to radiate in a horizontal beam aperture.

15. The system according to claim 14, wherein the horizontal beam aperture width is substantially from 3 to substantially 15 degrees.

16. The system according to claim 1, wherein the system is adapted to communicate with multiple wireless area network devices.

17. The system according to claim 1, wherein the system is adapted to communicate with Personal Computers.

18. The system according to claim 1, wherein the system is adapted to communicate with at least one TV device.

19. The system according to claim 8, wherein said programmable phase shift is +/−180 degrees.

20. The system according to claim 8, wherein said programmable phase shift is +/−180 degrees and wherein said programmable phase shift is created by using transmission lines for inversing the signal phase.

21. The system according to claim 1, wherein wireless area network compliant signals are transmitted in the about 57 to about 64 GHz band.

22. The system according to claim 12, wherein the system is selectively switching between two radiation modes.

23. The system according to claim 12, wherein the system is selectively switching between two radiation modes and wherein said at least one phased array antenna frame comprises two linear one-dimensional arrays of radiators.

24. The system according to claim 12, wherein said selectively switching between different radiation modes depends on the level of signals that arc received in said different phase modes.

25. The system according to claim 14, wherein said horizontal beam aperture is steered horizontally according to a programmable pattern.

26. The system according to claim 1, wherein transmitting and receiving wireless area network compliant signals from or to wireless area network devices is optionally performed through building walls.

27. The system according to claim 5, wherein the phased array antenna circuit comprises:

a. an oscillator circuit for providing a reference signal, b. at least two levels of phase shifted locked injected push-push oscillators for steering a beam that is created by the phased array antenna frame;

c. up converters for up converting a signal that is transmitted by the phased array antenna and down converters for down converting a signal that is received by the phased array antenna; and d. transmission lines for selectively providing a phase shift to a reference signal that is provided to said up or down converters.

28. A method for phased array antenna wireless communication, comprising the steps of providing at least one phased array antenna frame and phased array antenna circuit connected to the at least one phased array antenna frame; and controlling said at least one phased array antenna frame by said phased array antenna circuit to transmit and receive wireless personal area network compliant signals from or to wireless area network devices, wherein said phased array antenna circuit comprises a plurality of phased shifted locked injected push-push oscillator (PSIPPO).

29. A circuit for driving a phased array antenna wireless communication system comprising:

a. an oscillator circuit for providing a reference signal, b. at least two levels of phase shifted locked injected push-push oscillators (PSIPPO) for steering a beam that is created by the phased array antenna frame;

c. up converters for up converting a signal that is transmitted by the phased array antenna and down converters for down converting a signal that is received by the phased array antenna; and d. transmission lines for selectively providing a phase shift to a reference signal that is provided to said up or down converters.

30. The circuit for driving a phased array antenna wireless communication system according to claim 29, wherein at least one of the at least two levels of phase shifted locked injected push-push oscillators is used for steering a beam that is created by the phased array antenna frame horizontally, and at least one of the at least two levels of phase shifted locked injected push-push oscillators is used for steering a beam that is created by the phased array antenna frame vertically.

* * * * *